(12) United States Patent
Kezzou et al.

(10) Patent No.: US 8,213,614 B2
(45) Date of Patent: Jul. 3, 2012

(54) DISTRIBUTION AND PRINTING OF TRAVEL DOCUMENTS

(75) Inventors: Aziz Kezzou, Grasse (FR); Jean-Michel Sauvage, Cannes (FR); Edouard Hubin, Grasse (FR)

(73) Assignee: Amadeus S.A.S., Sophia Antipolis (FR)

( * ) Notice: Subject to any disclaimer, the term of this patent is extended or adjusted under 35 U.S.C. 154(b) by 313 days.

(21) Appl. No.: 12/565,567

(22) Filed: Sep. 23, 2009

(65) Prior Publication Data
US 2010/0293386 A1 Nov. 18, 2010

(30) Foreign Application Priority Data

May 18, 2009 (EP) .................................... 09305451

(51) Int. Cl.
- *G09C 3/08* (2006.01)
- *H04K 1/00* (2006.01)
- *H04L 29/06* (2006.01)
- *H04L 9/32* (2006.01)
- *G06F 7/04* (2006.01)

(52) U.S. Cl. .......... 380/247; 380/51; 380/255; 713/150; 713/153; 713/156; 713/176; 713/181; 726/32

(58) Field of Classification Search ............... 380/51, 380/247, 255; 713/150, 153, 156, 176, 181; 726/32
See application file for complete search history.

(56) References Cited

U.S. PATENT DOCUMENTS

| | | | | |
|---|---|---|---|---|
| 6,994,250 | B2 * | 2/2006 | Al Amri | 235/375 |
| 2002/0174205 | A1 * | 11/2002 | Nakashima | 709/221 |
| 2003/0101342 | A1 * | 5/2003 | Hansen | 713/167 |
| 2004/0153649 | A1 * | 8/2004 | Rhoads et al. | 713/176 |

FOREIGN PATENT DOCUMENTS

| | | |
|---|---|---|
| EP | 0 691 619 A2 | 1/1996 |
| EP | 1 220 076 A2 | 7/2002 |
| EP | 1 271 297 A2 | 1/2003 |
| WO | WO 2008/030184 A1 | 3/2008 |

OTHER PUBLICATIONS

European Search Report for European application No. EP 09 30 5451.8 (Oct. 19, 2009).
Zimmerman et al., "Travel Card: Airport Self-Check in Using a Wireless PDA," IEEE Intelligent Transport Systems Conference Proceedings, Oakland, CA (Aug. 25, 2001).
Flynn et al., "The Satchel System Architecture: Mobile Access to Documents and Services," Mobile Networks and Applications, vol. 5, p. 243-258 (Dec. 1, 2000).
Lamming et al., "Satchel: Providing Access to Any Document, Any Time, Anywhere," ACM Transactions on Computer-Human Interaction, vol. 7, No. 3, p. 322-352 (Sep. 30, 2000).

* cited by examiner

*Primary Examiner* — Mohammad Reza
(74) *Attorney, Agent, or Firm* — Jenkins, Wilson, Taylor & Hunt, P.A.

(57) ABSTRACT

A system for generating and printing travel documents for a customer associated with a journey having one or more parts, the system comprising: a travel documentation distribution module capable of generating travel documentation for the customer and capable of passing the documents for storage on a customer device at the request of the customer; and a printer located in the vicinity of a starting point of one of the parts of the journey which is capable of responding to a short range communication from the customer device to print the travel documents for said part of the journey for the customer.

18 Claims, 4 Drawing Sheets

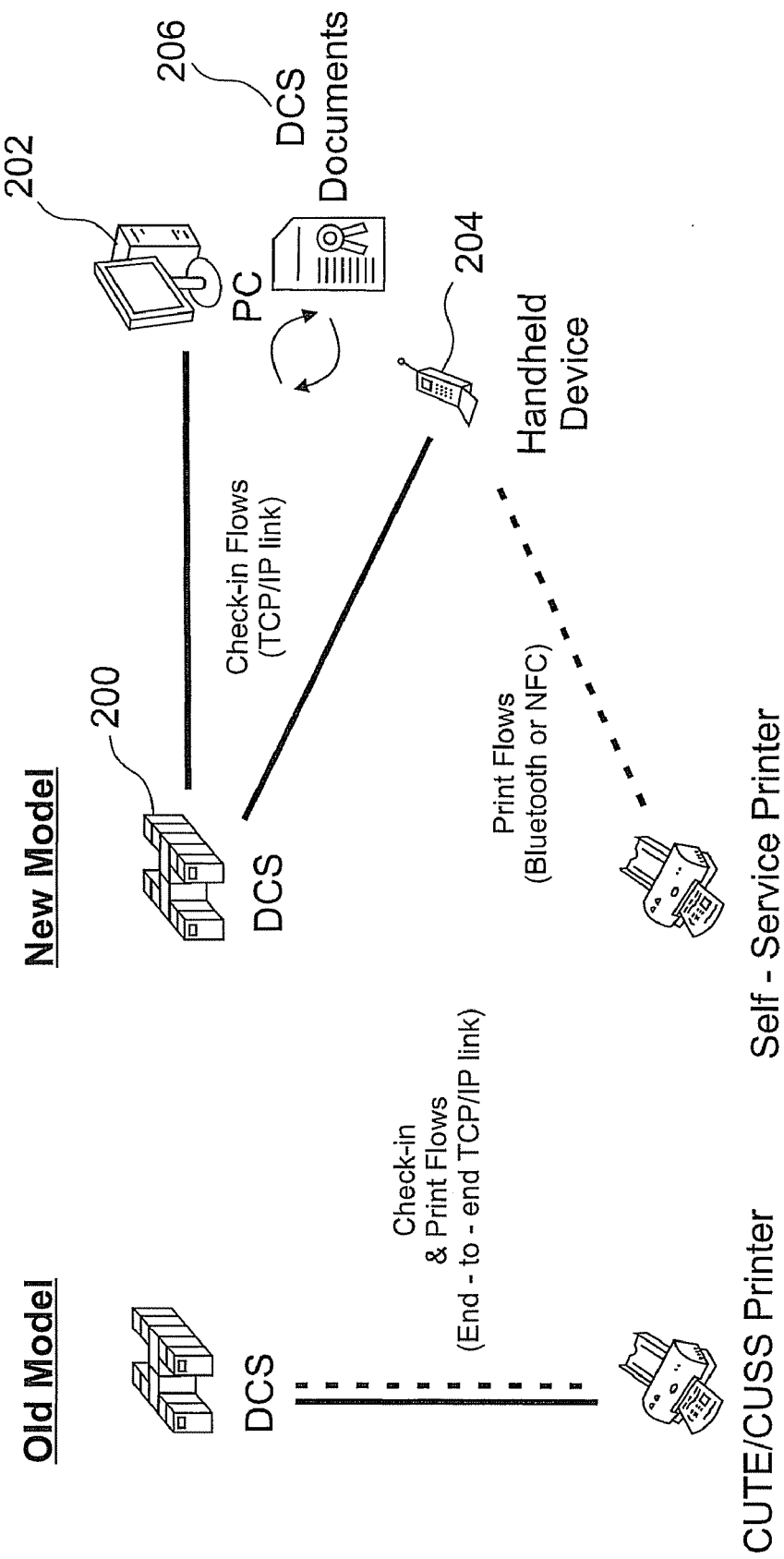

| Organization | Document Type | Status |
|---|---|---|
| Amadeus | Boarding Pass | Ready |
| Amadeus | Bag Tag | Ready |
| Amadeus | Generic | Ready |
| Air France | Boarding Pass | Out Of Paper |
| Air France | Generic | Ready |
| Qantas | Boarding Pass | Disabled |
| Qantas | Generic | Ready |

*Fig. 5*

DISTRIBUTION AND PRINTING OF TRAVEL DOCUMENTS

RELATED APPLICATION

This application claims the benefit of European patent application no. EP09305451.8 filed May 18, 2009, the entire disclosure of which is herein incorporated by reference.

FIELD OF THE INVENTION

The present invention relates to the distribution and printing of travel documents, particularly departure control system (DCS) documents including but not limited to boarding passes and bag tags.

BACKGROUND OF THE INVENTION

A paperless environment in an airport is an ultimate goal for the air travel industry as a whole. In reality, this is going to take many years to realize due to the fact that every check-in desk, every passport station, every security station, and every boarding gate must be updated to operate in a paperless environment. This will take many years to realize and in some airports may never be fully implemented due to cost implications and/or other issues. Already many airlines are providing the ability for customers to check-in and print off 2D-barcode boarding passes at home or in the office. Others are sending such documents in digital form directly to the passenger mobile phone using MMS (Multimedia Messaging Service). The objective is eventually to store the boarding pass on a personal digital assistant or equivalent and then have barcode readers at each point at which the boarding pass will normally be shown to avoid the need for paper copies thereof. Similar changes are anticipated with respect to the provision of bag tags and other travel documentations.

Referring to FIG. 1, the current system for printing departure control system documents is rigid and requires an extensive network infrastructure at an airport or other locations where these documents may be printed such as in hotels for example. This requires an established end-to-end network connection (i.e. TCP/IP link) between a departure control system (DCS) and a Common Use Terminal Equipment (CUTE) workstation or a Common Use Self-Service (CUSS) kiosk. The CUTE workstation is used by airport or airline staff to print boarding passes and other travel documents for example at a check-in desk. The CUSS kiosk is used by the customer (in self service mode) to generally print boarding passes, and is activated by a reference number, such as the passenger frequent flyer identifier or e-ticket number. The current method can be slow due to the fact that all communications are linked back to the same DCS and only specific printers (both in terms of hardware and software) are available to print such documents. In addition, due to these delays and other issues, for example there are often queues of passengers waiting to be processed either via the kiosk or by airline staff; this is not aligned with the need for streamlined processes for customers.

There already exists a facility to check-in via the web and then print off boarding passes at home or in the office. This has produced certain security threats as false boarding passes can be generated with little effort by a malicious third party to enter the boarding area in the airport. In addition, since all the check-in process is carried out before the customer sets out for his or her journey, cancellation and changes for the check-in preferences may not be implemented easily or communicated to the customers. Airports also provide the facility for kiosk check-in which requires the use of a credit card or ticket number to access the boarding pass which is then printed by the kiosk. Each kiosk is specific to a specific airline and requires considerable space and is relatively costly to implement. If customers then wish to check-in a bag they must queue again to do this by means of a manned desk.

A mobile check-in has been implemented in certain limited examples. The DCS sends a check-in notification via SMS (Short Message Service) to registered customers at a predetermined time limit before departure. The customers can then reply by SMS to confirm the check-in and receive detailed information such as seat number, boarding time etc. However, the customer is still required to use either a check-in counter or a self-service kiosk to print paper boarding passes and bag tags and still has to deposit bags at a manned desk. In addition, SMS is subject to roaming issues and requires prior registration from customers. Also, establishment of agreements with telecommunication providers is necessary to enable messaging to occur in all locations. Finally, SMS check-in is not particularly sophisticated and does not allow the customer to deal with advanced check-in features such as seat selection, payment of excess baggage charges, handling disruption, etc.

WO2008/030814 discloses a method and system for providing an authentication system in order to retrieve stored data. The data is encrypted through specific keys which use biometric sources. The patent application also discloses a method for printing a document from a hand-held device. The application does not disclose any details of how to manage the printing of a document from a hand-held device in order to ensure that security issues are met and to provide the other advantages of the present invention.

OBJECTS OF THE INVENTION

One aspect of the present invention is to overcome at least some of the problems associated with the prior art.

A further object of the present invention is to provide an improved distribution and printing facility for travel documents, which does not rely on an expensive centralized IT infrastructure.

A final object of the invention is to enable paperless air travel journey across heterogeneous airports with varying levels of IT infrastructure sophistication.

SUMMARY OF THE INVENTION

The present invention provides a method and system as set out in the accompanying claims.

According to one aspect of the present invention there is provided a method for generating and printing travel documents for a customer associated with a journey having one or more parts, the method comprising: generating travel documentation for the customer at a travel documentation distribution module and passing the documents for storage on a customer device at the request of the customer; printing travel documents at a printer located in the vicinity of a starting point of one of the parts of the journey which is capable of responding to a short range communication from the customer device to print the travel documents for said part of the journey for the customer.

According to a second aspect of the present invention there is provided a system for generating, storing and printing travel documents for a customer associated with a journey having one or more parts, the system comprising: a travel documentation distribution module capable of generating travel documentation for the customer; a customer device capable of connecting to the travel documentation distribution module in order to obtain travel documents related to the customer, wherein the travel documents are stored on the customer device; a printer located in the vicinity of a starting point of one of the parts of the journey which is capable of responding to a short range communication from the customer device to print travel documents for said part of the journey for the customer.

BRIEF DESCRIPTION OF THE DRAWINGS

Reference will now be made, by way of example, to the accompanying drawings, in which:

FIG. 1 is a simple representation of a system, in accordance with the prior art, FIG. 2 is a simple representation of a system, in accordance with an embodiment of the invention, given by way of example, FIG. 5 is a self-service printer look up table, in accordance with an embodiment of the invention, given by way of example.

DETAILED DESCRIPTION OF THE PREFERRED EMBODIMENTS

Figure 3:
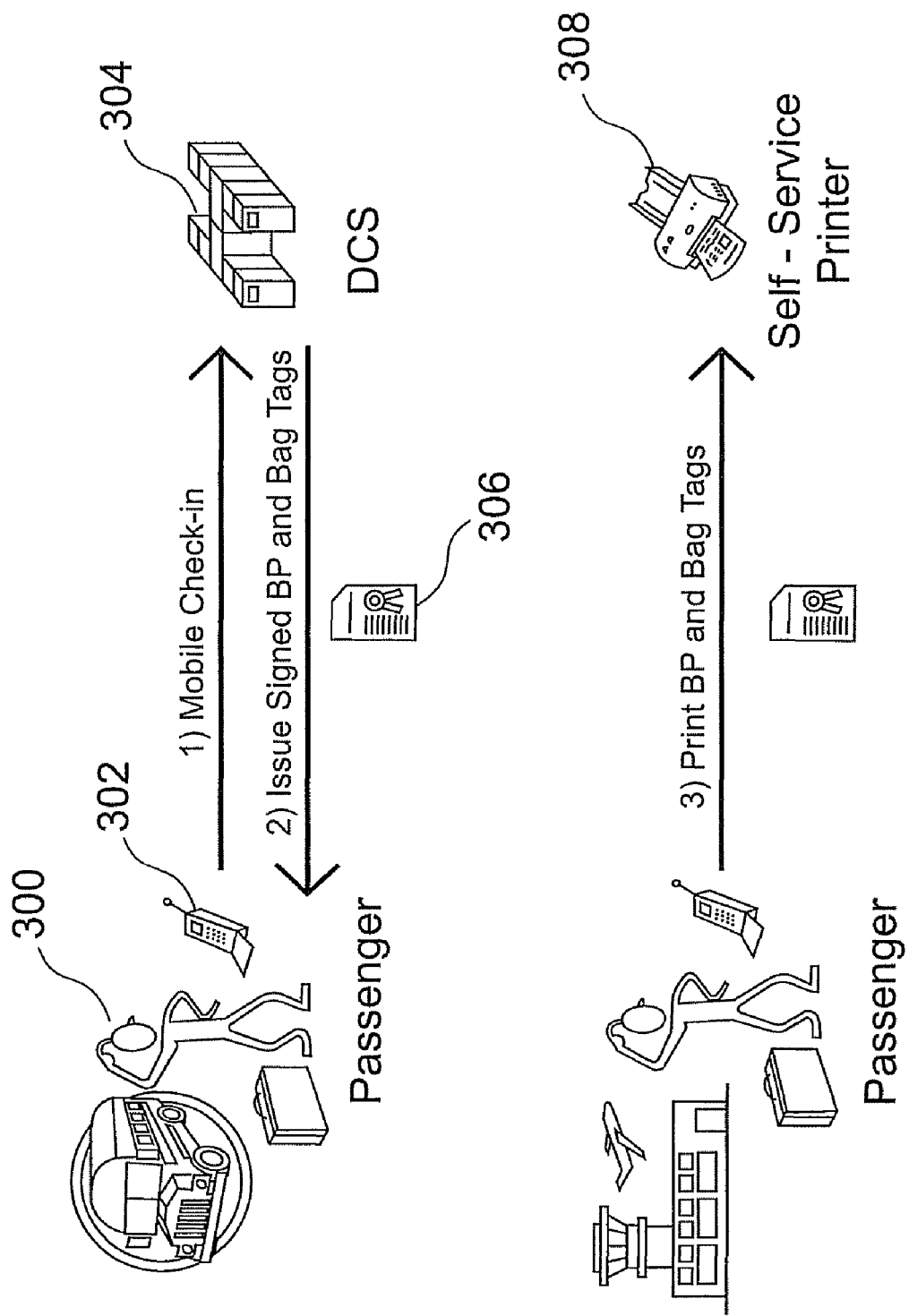
FIG. 3 is a representation of a self-service printer and mobile check-in, in accordance with an embodiment of the invention, given by way of example.

In accordance with the present invention, FIG. 2 shows a new model to handle DCS document distribution. The DCS document distribution module 200 is no longer connected to a printer. Instead, the DCS 200 is connected to a PC 202 and/or a hand-held device 204. The hand-held device may be a mobile telephone or any other personal digital assistant (PDA). Check-in is effected by means of the PC 202 or normally the hand-held device 204 and the appropriate documentation 206 is passed to the PC 202 and/or hand-held device 204 and/or USB key (not shown) to be stored there on. If the documentation is passed to the PC 202 a transfer may be necessary to a hand-held device 204. Ultimately the relevant documents for traveling such as boarding passes, bag tags and any other appropriate documents will be stored on the hand-held device 204. The details of how the documents are encrypted and security issues are handled will be described in greater detail below.

At a certain time later a customer will use the hand-held device to print the relevant documentation by means of self-service printers which may be located in the airport or elsewhere. The documents are sent to the printer by means of a Bluetooth or Near Field Communication (NFC) connection from the hand-held device to the printer. It will be appreciated that this means of communication between the printer and a hand-held device is not be limited to Bluetooth or NFC, but may use any appropriate connection, whether wired or wireless such as for example 2 DBC or use of a USB key.

This new model makes use of existing, widely adopted and, from the airport point of view, free IT infrastructure mostly provided by the customers. By using a hand-held device one facility not provided for by the customer is the printing facility which can be provided with stand-alone self-service printers. There is no need for a costly and complex TCP/IP link (WAN lines) between the DCS and specific printers or kiosks manned by airport staff. In addition, by making the DCS services available to customers by means of their mobile phone the customers have greater flexibility in relation to the check-in process. For example, the customer could check-in whilst on the bus, on the way to the airport. All issued travel documents are saved in a memory location on the mobile phone or in a link such as SMS or internet link until they are printed "on-the-go" at the airport before accessing a secured zone or checking in a bag.

As all check-in actions are carried out from a mobile phone or PC there is no need to connect the self-service printer to the DCS using expensive WAN (Wide Area Network) lines and routers. However, connectivity through the airport LAN (Local Area Network) may be necessary to allow for maintenance and troubleshooting.

As the model is effectively a self-service model, IT and staff cost savings are made.

A mobile phone includes a SIM card which uniquely identifies the user of the phone. This may mean that systematic and tedious passenger identification processes can be minimized. An initial mapping occurs between the FQTV identifier (also known as the frequent flier identification number), for example, and a SIM card identifier on the phone during an initial enrolment phase. Thereafter, the SIM card is sufficient identification for the user when required. The risk of security and privacy issues due to a stolen mobile phone is no more significant than the risks associated with FQTV and credit cards. In fact, mobile phones are generally better protected against theft through pin codes and remote deactivation processes.

Another important feature of making use of the present model is that the connectivity and security features of the mobile phone make it a good payment terminal. Many mobile phones include such applications as: SMS payments, touch to pay, etc. which means tickets can be paid for by means of the mobile phone.

The current wireless infrastructure throughout the world makes connectivity to the Internet easier and enables a customer to manage a booking for a flight from anywhere. This has great advantages and a facility for printing travel documentation is still a further advantage provided by the present invention.

By use of protocols such as Bluetooth and NFC, a hand-held device can determine devices in their environment without requiring any configuration processes. This not only enables connectivity to the self-service printers according to the present invention, but also allows access to other applications. For example this type of connectivity may be used for: lounge access for business class passengers, self-service gate access, self-service boarding gate, self-service baggage retrieval, etc.

All documents issued from the DCS are signed digitally by the issuing airline making it almost impossible to forge documents or tamper therewith. The self service printers are able to verify the signature as described below as long as the signature has been issued by the issuing airline. This means false boarding passes are less likely to be able to be produced, which improves the security in the secured zones in the airport. A digital signature typically consists of computing a checksum and encrypting the same using the issuer's private key which is kept secret. The public key of the issuer is then used by the printer to check the integrity and origin of the document by computing the same signature and comparing it with that attached to the document. The security model proposed in the present invention is based on the public key infrastructure which allows distribution of the public key amongst trusted organizations. In respect of the DCS these organizations include DCS providers, airlines, ground handlers, CUTE/CUSS platform providers, airport IT administrators, etc.

The present invention provides a step towards the paperless environment that is sought by so many. Providing the facility to have travel documents on a hand-held device means that when barcode readers are introduced at gates and security locations the travel documents are already on the hand-held device. Until that time, the self-service printers can be used in any environment which has not been upgraded to barcode readers. This means that the progress towards paperless check-in and boarding has started with the present invention offering an ideal interim solution.

By adopting the present invention airports can consider modernization of the infrastructure in a different light. Investment into extensive networks is less necessary and that investment can be directed towards the required infrastructure for the paperless environment. In addition, by utilizing the present invention for baggage check-in, there will be no need for customers to queue at the check-in counter in order to pass over baggage. This will speed up the process for any customers traveling with baggage.

A self-service printer is a simple device and can be easily shared by different airlines as there is no airline specific business logic. This will mean less space consumption and less physical resources in an airport.

Referring now to FIG. 3, a more detailed explanation of the present invention will now be provided. A customer 300 can check-in from anywhere, using a mobile hand-held device 302 or a PC (not shown). Once the check-in process is completed, the DCS 304 generates and downloads the digitally signed necessary travel documentation 306. This travel documentation may include a boarding pass, bag tags and any other appropriate documentation. When a customer has used a hand-held device 302 to carry out the check-in process the documentation is stored directly on the hand-held device. However, if the customer has used a PC the documentation must be transferred onto the hand-held device in an appropriate manner. Later, at the airport the customer locates an appropriate self-service printer 308 and by means of any appropriate short-range communication technology (for example Bluetooth; NFC; 2 DBC; a USB key; memory cards etc) downloads the travel documents to the printer for printing. Since the documents are digitally signed the printer uses a check to determine whether the digital signature, attached to the document to be printed, is correct. This guarantees the document origin and integrity.

The printer includes a number of standard facilities and a number of specific facilities associated with the present invention. The printer can check the identity of the issuer of the document (that is the airline not the passenger) in order to charge for printing the document when the printer is owned by an airport and used as a community printing platform for example. The printer can also identify from the document, the types of document and therefore select the correct type of paper.

Figure 4:
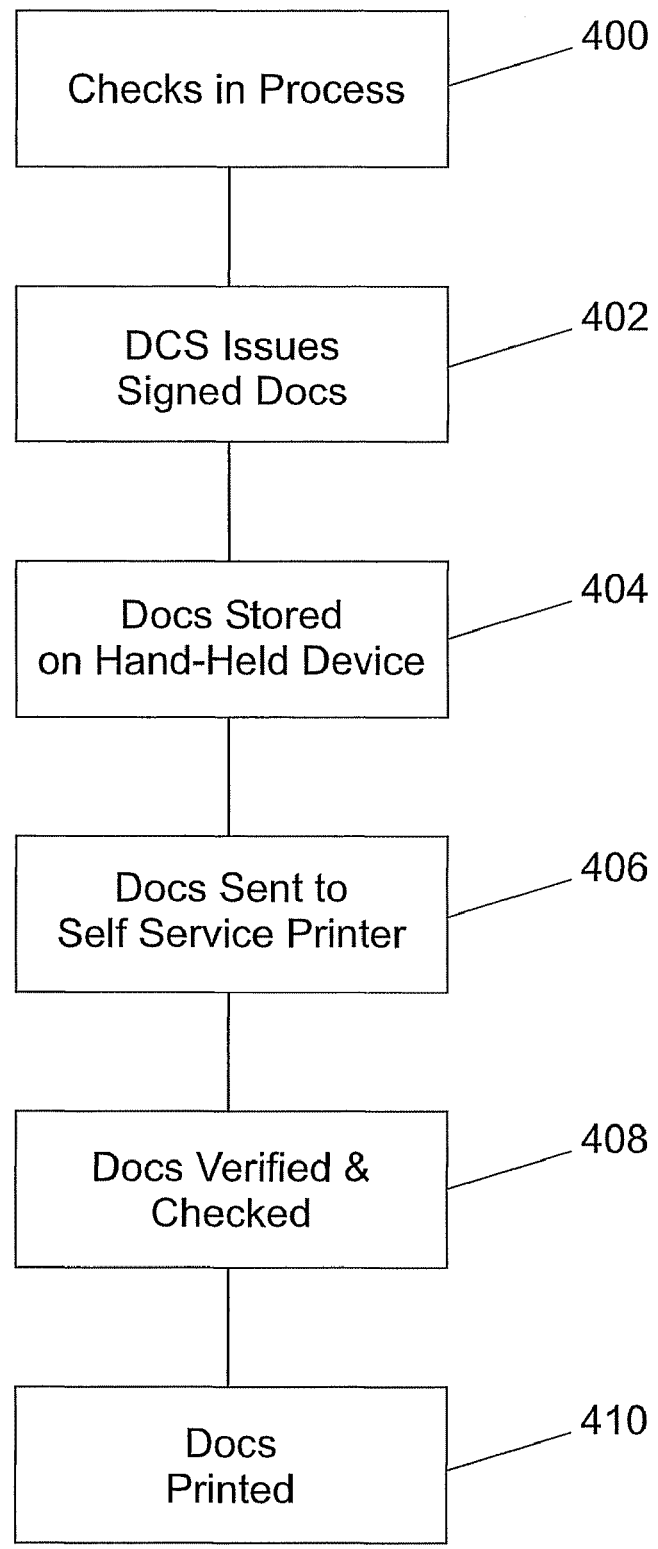
FIG. 4 is a flow chart showing the method steps, in accordance with an embodiment of the invention, given by way of example.

The method steps of the present invention will now be described with reference to FIG. 4. At the step 400 the check-in process is carried out by means of either a computer or hand-held device. At step 402 the DCS issues the signed documents to the customer. At step 404 the documents are stored on a hand-held device either directly, or by transfer from the computer. At some time in the future a customer wishes to print out the signed documents and locates an appropriate self-service printer, for example in an airport location. Subsequently at step 406 the documents are sent from the hand-held device to the self-service printer. The documents are verified and checked at step 408 and finally printed at step 410.

The description has identified the three important elements for the present invention, namely the travel documents, the mobile application on the hand-held device that retrieves documents from the DCS and stores them on the hand-held device and the self-service printer. The technical specification of each of these blocks or elements will now be described in greater detail.

The travel documents may relate to one or more parts, or legs, of a journey. For example, where a customer is obtaining documents for a specific journey, there may be one or more flights in either direction and each part may require different documents. The different documents can all be downloaded at the same time or at different times, depending on the circumstance.

The travel document format used to convey the digitally signed travel documents is essentially a wrapper around existing graphical formats to avoid the requirement of redefining already existing documents. In addition, the format performs and provides missing features required by the invention, such as digital signature etc. The format is ideally open, (i.e. in compliance with a public specification to allow the interoperability) adaptable and structured (i.e. XML based) in order to allow the format to be interchangeable with different organizations and airlines. Ideally, the format may wrap the various existing graphic formats of current day documents, such as SVG, PDF, postscript, JPEG etc. For example standard MIME (Multipurpose Internet Mail Extensions) types can be used to identify the format of the embedded data. In addition, the format may support the digital signature of the document data and meta data (for example date, author, etc) in order to guarantee the origin and integrity of the documents and allow for the verification processes to be completed. Ideally the document format may enable the documents to occupy the minimum size in order to speed up the download over slower networks.

In order to accommodate the forthcoming paperless environments the format may include, for example, a 2-D barcode that can be used for paperless check-in if appropriate readers are available. In addition, the format may include a mechanism to add additional meta-data to indicate how the documents can be used by the customer. For example, this meta-data may indicate the number of copies of the document to print and also give information relating to the type of paper etc. Ideally the document format will be open to all potential users and predefined by the same in order to ensure interoperability and guarantee worldwide deployment.

A specific software application may be required on the hand-held device (and if necessary the computer) in order to receive the signed travel documents from the DCS. In addition, an appropriate interface may be needed with the self-service printers. In the event that the document format is standardized, the application may be provided by many software providers along with the support to print these documents on dedicated self-service printers. In an example, the hand-held application may be implemented as a Java MIDlet and ideally fulfils at least some of the following requirements. The application may be downloadable from the Internet or other appropriate location. The application may be able to operate in both pull and push modes in order to retrieve the appropriate issued documents. A certain degree of storage may be required to store the received DCS documents and the application should be able to identify appropriate self-service printers. A facility to view the travel documents may also be included within the application, for example using a specific part of the document to view the data such as a 2-D barcode. The application may further include the ability to verify the digital signature of the document.

The self-service printer should also fulfill a set of technical requirements. For example, the printer may include a dynamic look-up mechanism and publish a list of supported organizations and document types. This will enable the hand-held device to identify available printers which can support the documents that are required to be printed. In addition, the published list may include the status of the different organizations and document types as set out in the table of FIG. 5.

The printer may support wireless connectivity, such as Bluetooth, infrared NEC and barcode options to communicate with the hand-held device. The printer may also include a verification module which supports a public key infrastructure in order to verify the digital signature of the documents and reject any print requests from documents with invalid signatures. The printer may include a synchronous print service with a short queue length to avoid printing documents after the customer has left. In addition, an acknowledgement of either success or failure may be provided to the customer and the customer may be able to cancel the print operation at any time. The printer may be able to handle concurrent requests from different customers and may support a notification mechanism to indicate print success or failure. The printer may include a number of sensors which detect whether a document has been retrieved or not. If printed documents are not retrieved within a particular time period, the documents may be locked within an internal holder so that nobody can then retrieve them. The printer may include a visual display means to display messages to the customer and the documents before they are printed. The printer may include different trays holding different types of paper for different organizations and document types. The processing associated within the printer may require a valid payment token to be attached to the document before it can be printed in order to ensure that payment of the ticket has been effected before a boarding pass is issued.

In the event that the hand-held device does not support a wireless connectivity the customer may store the documents on a USB key (or any other memory device such as an iPod) which may then be inserted into a USB slot on the printer in order for the printer to receive the relevant data. In addition, other means of communication between the customer and the printer may also be used assuming that the DCS documents are available to the printer and appropriately digitally signed to enable verification. Similarly, the hand-held device is not the only means by which a customer can transport the DCS documents from the point of check-in to the point at which a boarding pass is issued. Instead, any other appropriate device may be used.

With respect to other documentation for travel, such as baggage tags, in the same printer may be used as for boarding passes. However, separate self-service printers may be more appropriate. These may be located in the proximity of a baggage desk, where bags can be handed over after the tags have been applied. Alternatively, the customer may generate the printing of the bag tags and the bag tags may be applied by an appropriate agent. Other travel documentation, for example entry into a business lounge, may be printed as appropriate and use the most appropriately located and configured self-service printer.

In the event of delay and cancellation of flights, the travel documents on the hand-held device may be used for other functions, for example generating vouchers for meals, or effecting the necessary refund. The person skilled in the art would appreciate that the travel document on the hand-held device have limitless other possibilities, such as providing the information necessary for shops in the duty-free area and for ensuring that special needs are catered for.

This invention has been described with reference to the purchase of tickets in the travel environment and to the printing of boarding passes and other travel documents. However, it will be appreciated that the invention may apply to other environments, for example other selling and marketing applications such as hotels; combinations of flight and hotel; etc as well as other printing environment, such as train tickets etc.

The present invention may be implemented in software, hardware or any combination thereof. In the description where elements are referred to as software they may be implemented by an equivalent hardware module. Similarly, where elements are referred to as hardware module is what elements may be implemented by an equivalent software application or program.

It will be appreciated that this invention may be varied in many different way and still remain within the intended scope and spirit of the invention.

What is claimed is:

1. A system for generating, storing and printing travel documents for a customer associated with a journey having one or more parts, the system comprising:

a travel documentation distribution module capable of generating travel documentation for the customer, wherein generating travel documentation for the customer includes generating at least one of a boarding pass with a digital signature or a bag tag with a digital signature, wherein generating the at least one of the boarding pass with the digital signature or the bag tag with the digital signature includes computing a first checksum and encrypting the first checksum with a private key associated with the travel documentation distribution module;

a hand-held customer device for wirelessly connecting to a printer and capable of connecting to the travel documentation distribution module, obtaining the at least one of the boarding pass with the digital signature or the bag tag with the digital signature from the travel documentation distribution module, and storing the at least one of the boarding pass with the digital signature or the bag tag with the digital signature on the hand-held customer device; and a printer located in the vicinity of a starting point of one of the parts of the journey which is capable of responding to a short range communication from the hand-held customer device to print travel documents for said part of the journey for the customer, wherein responding to the short range communication from the hand-held customer device to print travel documents for said part of the journey for the customer includes verifying at least one of the digital signature of the boarding pass stored on the hand-held customer device or the digital signature of the bag tag stored on the hand-held customer device, wherein verifying the at least one of the digital signature of the boarding pass stored on the hand-held customer device or the digital signature of the bag tag stored on the hand-held customer device includes computing a second checksum, using a public key associated with the travel documentation distribution module to decrypt the first checksum, and verifying that the decrypted first checksum matches the computed second checksum, and in response to verifying the at least one of the digital signature of the boarding pass stored on the hand-held customer device or the digital signature of the bag tag stored on the hand-held customer device, printing the at least one of the boarding pass stored on the hand-held customer device or the bag tag stored on the hand-held customer device.

2. The system as claimed in claim 1, wherein the travel documents include the digital signature.

3. The system as claimed in claim 2, wherein the printer includes a verification module for verifying the digital signature.

4. The system as claimed in claim 1, wherein the printer includes a module for identifying meta-data associated with operational instructions.

5. The system as claimed in claim 1, wherein the travel documents include boarding passes, bag tags and any travel documents required for one or more part of the journey.

6. The system as claimed in claim 1, wherein the travel documents are formatted to ensure interoperability with any document originator or document type.

7. The system as claimed in claim 1, wherein the travel document is stored as a link which can be retrieved later by access to a network connection.

8. The system as claimed in claim 1, wherein the stored travel documents are not printed but processed by electronic readers capable of reading the stored travel documents.

9. A system for generating and printing travel documents for a customer associated with a journey having one or more parts, the system comprising:
a travel documentation distribution module capable of generating travel documentation for the customer and capable of passing the travel documentation from the travel documentation distribution module to a hand-held customer device capable of wirelessly connecting to a printer for storage on the hand-held customer device at the request of the customer, wherein generating travel documentation for the customer includes generating at least one of a boarding pass with a digital signature or a bag tag with a digital signature, wherein generating the at least one of the boarding pass with the digital signature or the bag tag with the digital signature includes computing a first checksum and encrypting the first checksum with a private key associated with the travel documentation distribution module, and wherein passing the travel documentation to the hand-held customer device for storage on the hand-held customer device includes storing the at least one of the boarding pass with the digital signature or the bag tag with the digital signature on the hand-held customer device; and
a printer located in the vicinity of a starting point of one of the parts of the journey which is capable of responding to a short range communication from the hand-held customer device to print travel documents for said part of the journey for the customer, wherein responding to the short range communication from the hand-held customer device to print travel documents for said part of the journey for the customer includes verifying at least one of the digital signature of the boarding pass stored on the hand-held customer device or the digital signature of the bag tag stored on the hand-held customer device, wherein verifying the at least one of the digital signature of the boarding pass stored on the hand-held customer device or the digital signature of the bag tag stored on the hand-held customer device includes computing a second checksum, using a public key associated with the travel documentation distribution module to decrypt the first checksum, and verifying that the decrypted first checksum matches the computed second checksum, and in response to verifying the at least one of the digital signature of the boarding pass stored on the hand-held customer device or the digital signature of the bag tag stored on the hand-held customer device, printing the at least one of the boarding pass stored on the hand-held customer device or the bag tag stored on the hand-held customer device.

10. The system as claimed in claim 9, wherein the travel documents include the digital signature.

11. The system as claimed in claim 9, wherein the printer includes a verification module for verifying the digital signature.

12. The system as claimed in claim 9, wherein the printer includes a module for identifying meta-data associated with operational instructions.

13. A travel documentation distribution hardware module capable of generating travel documentation for a customer associated with a journey having one or more parts and capable of passing documents for storage on a hand-held customer device at a request of the customer for use in a system for generating, storing and printing travel documents for a customer associated with a journey having one or more parts, the system comprising:
a travel documentation distribution module capable of generating travel documentation for the customer, wherein generating travel documentation for the customer includes generating at least one of a boarding pass with a digital signature or a bag tag with a digital signature, wherein generating the at least one of the boarding pass with the digital signature or the bag tag with the digital signature includes computing a first checksum and encrypting the first checksum with a private key associated with the travel documentation distribution module;
a hand-held customer device for wirelessly connecting to a printer and capable of connecting to the travel documentation distribution module, obtaining the at least one of the boarding pass with the digital signature or the bag tag with the digital signature from the travel documentation distribution module, and storing the at least one of the boarding pass with the digital signature or the bag tag with the digital signature on the hand-held customer device; and
a printer located in the vicinity of a starting point of one of the parts of the journey which is capable of responding to a short range communication from the hand-held customer device to print travel documents for said part of the journey for the customer, wherein responding to the short range communication from the hand-held customer device to print travel documents for said part of the journey for the customer includes verifying at least one of the digital signature of the boarding pass stored on the hand-held customer device or the digital signature of the bag tag stored on the hand-held customer device, wherein verifying the at least one of the digital signature of the boarding pass stored on the hand-held customer device or the digital signature of the bag tag stored on the hand-held customer device includes computing a second checksum, using a public key associated with the travel documentation distribution module to decrypt the first checksum, and verifying that the decrypted first checksum matches the computed second checksum, and in response to verifying the at least one of the digital signature of the boarding pass stored on the hand-held customer device or the digital signature of the bag tag stored on the hand-held customer device, printing the at least one of the boarding pass stored on the hand-held customer device or the bag tag stored on the hand-held customer device.

14. A printer located in the vicinity of a starting point of one part of a journey which is capable of responding to a short range communication from a hand-held customer device to print travel documents for said part of the journey for the customer for use in a system for generating, storing and printing travel documents for a customer associated with a journey having one or more parts, the system comprising:

a travel documentation distribution module capable of generating travel documentation for the customer, wherein generating travel documentation for the customer includes generating at least one of a boarding pass with a digital signature or a bag tag with a digital signature, wherein generating the at least one of the boarding pass with the digital signature or the bag tag with the digital signature includes computing a first checksum and encrypting the first checksum with a private key associated with the travel documentation distribution module;

a hand-held customer device for wirelessly connecting to a printer and capable of connecting to the travel documentation distribution module, obtaining the at least one of the boarding pass with the digital signature or the bag tag with the digital signature from the travel documentation distribution module, and storing the at least one of the boarding pass with the digital signature or the bag tag with the digital signature on the hand-held customer device; and a printer located in the vicinity of a starting point of one of the parts of the journey which is capable of responding to a short range communication from the hand-held customer device to print travel documents for said part of the journey for the customer, wherein responding to the short range communication from the hand-held customer device to print travel documents for said part of the journey for the customer includes verifying at least one of the digital signature of the boarding pass stored on the hand-held customer device or the digital signature of the bag tag stored on the hand-held customer device, wherein verifying the at least one of the digital signature of the boarding pass stored on the hand-held customer device or the digital signature of the bag tag stored on the hand-held customer device includes computing a second checksum, using a public key associated with the travel documentation distribution module to decrypt the first checksum, and verifying that the decrypted first checksum matches the computed second checksum, and in response to verifying the at least one of the digital signature of the boarding pass stored on the hand-held customer device or the digital signature of the bag tag stored on the hand-held customer device, printing the at least one of the boarding pass stored on the hand-held customer device or the bag tag stored on the hand-held customer device.

15. A hand-held customer device capable of connecting to a travel documentation distribution module in order to obtain travel documents related to a customer associated with a journey having one or more parts, wherein the travel documents are stored on the hand-held customer device and wherein the hand-held customer device is capable of transmitting the documents by a short range communication to a printer located in the vicinity of a starting point of one part of a journey which is capable of printing the travel documents for said part of the journey for the customer for use in a system for generating, storing and printing travel documents for a customer associated with a journey having one or more parts, the system comprising:

a travel documentation distribution module capable of generating travel documentation for the customer, wherein generating travel documentation for the customer includes generating at least one of a boarding pass with a digital signature or a bag tag with a digital signature, wherein generating the at least one of the boarding pass with the digital signature or the bag tag with the digital signature includes computing a first checksum and encrypting the first checksum with a private key associated with the travel documentation distribution module;

a hand-held customer device for wirelessly connecting to a printer and capable of connecting to the travel documentation distribution module, obtaining the at least one of the boarding pass with the digital signature or the bag tag with the digital signature from the travel documentation distribution module, and storing the at least one of the boarding pass with the digital signature or the bag tag with the digital signature on the hand-held customer device; and a printer located in the vicinity of a starting point of one of the parts of the journey which is capable of responding to a short range communication from the hand-held customer device to print travel documents for said part of the journey for the customer, wherein responding to the short range communication from the hand-held customer device to print travel documents for said part of the journey for the customer includes verifying at least one of the digital signature of the boarding pass stored on the hand-held customer device or the digital signature of the bag tag stored on the hand-held customer device, wherein verifying the at least one of the digital signature of the boarding pass stored on the hand-held customer device or the digital signature of the bag tag stored on the hand-held customer device includes computing a second checksum, using a public key associated with the travel documentation distribution module to decrypt the first checksum, and verifying that the decrypted first checksum matches the computed second checksum, and in response to verifying the at least one of the digital signature of the boarding pass stored on the hand-held customer device or the digital signature of the bag tag stored on the hand-held customer device, printing the at least one of the boarding pass stored on the hand-held customer device or the bag tag stored on the hand-held customer device.

16. A method for generating, storing and printing travel documents for a customer associated with a journey having one or more parts, the method comprising:

generating travel documentation for the customer at a travel documentation distribution module, wherein generating travel documentation for the customer includes generating at least one of a boarding pass with a digital signature or a bag tag with a digital signature, wherein generating the at least one of the boarding pass with the digital signature or the bag tag with the digital signature includes computing a first checksum and encrypting the first checksum with a private key associated with the travel documentation distribution module;

connecting to the travel documentation distribution module with a hand-held customer device capable of wirelessly connecting to a printer for obtaining and storing travel documents related to the customer, wherein obtaining and storing travel documents related to the customer includes obtaining the at least one of the boarding pass with the digital signature or the bag tag with the digital signature from the travel documentation distribution module, and storing the at least one of the boarding pass with the digital signature or the bag tag with the digital signature on the hand-held customer device; and printing travel documents at a printer located in the vicinity of a starting point of one of the parts of the journey in response to a short range communication from the hand-held customer device, wherein printing travel documents at the printer located in the vicinity of the starting point of one of the parts of the journey includes verifying at least one of the digital signature of the boarding pass stored on the hand-held customer device or the digital signature of the bag tag stored on the hand-held customer device, wherein verifying the at least one of the digital signature of the boarding pass stored on the hand-held customer device or the digital signature of the bag tag stored on the hand-held customer device includes computing a second checksum, using a public key associated with the travel documentation distribution module to decrypt the first checksum, and verifying that the decrypted first checksum matches the computed second checksum, and in response to verifying the at least one of the digital signature of the boarding pass stored on the hand-held customer device or the digital signature of the bag tag stored on the hand-held customer device, printing the at least one of the boarding pass stored on the hand-held customer device or the bag tag stored on the hand-held customer device.

17. A method for generating and printing travel documents for a customer associated with a journey having one or more parts, the method comprising:
  generating travel documentation for the customer at a travel documentation distribution module and passing the documents for storage on a hand-held customer device capable of wirelessly connecting to a printer at the request of the customer, wherein generating travel documentation for the customer includes generating at least one of a boarding pass with a digital signature or a bag tag with a digital signature, wherein generating the at least one of the boarding pass with the digital signature or the bag tag with the digital signature includes computing a first checksum and encrypting the first checksum with a private key associated with the travel documentation distribution module, and wherein passing the documents for storage on the hand-held customer device includes passing the at least one of the boarding pass with the digital signature or the bag tag with the digital signature from the travel documentation distribution module to the hand-held customer device and storing the at least one of the boarding pass with the digital signature or the bag tag with the digital signature on the hand-held customer device; and
  printing travel documents at a printer located in the vicinity of a starting point of one of the parts of the journey which is capable of responding to a short range communication from the hand-held customer device to print the travel documents for said part of the journey for the customer, wherein printing travel documents at the printer located in the vicinity of the starting point of one of the parts of the journey includes verifying at least one of the digital signature of the boarding pass stored on the hand-held customer device or the digital signature of the bag tag stored on the hand-held customer device, wherein verifying the at least one of the digital signature of the boarding pass stored on the hand-held customer device or the digital signature of the bag tag stored on the hand-held customer device includes computing a second checksum, using a public key associated with the travel documentation distribution module to decrypt the first checksum, and verifying that the decrypted first checksum matches the computed second checksum, and in response to verifying the at least one of the digital signature of the boarding pass stored on the hand-held customer device or the digital signature of the bag tag stored on the hand-held customer device, printing the at least one of the boarding pass stored on the hand-held customer device or the bag tag stored on the hand-held customer device.

18. A non-transitory computer readable medium comprising computer program instructions for carrying out a method for generating, storing and printing travel documents for a customer associated with a journey having one or more parts, the method comprising:
  generating travel documentation for the customer at a travel documentation distribution module, wherein generating travel documentation for the customer includes generating at least one of a boarding pass with a digital signature or a bag tag with a digital signature, wherein generating the at least one of the boarding pass with the digital signature or the bag tag with the digital signature includes computing a first checksum and encrypting the first checksum with a private key associated with the travel documentation distribution module;
  connecting to the travel documentation distribution module with a hand-held customer device capable of wirelessly connecting to a printer for obtaining and storing travel documents related to the customer, wherein obtaining and storing travel documents related to the customer includes obtaining the at least one of the boarding pass with the digital signature or the bag tag with the digital signature from the travel documentation distribution module, and storing the at least one of the boarding pass with the digital signature or the bag tag with the digital signature on the hand-held customer device; and
  printing travel documents at a printer located in the vicinity of a starting point of one of the parts of the journey in response to a short range communication from the hand-held customer device when said computer program is executed on a programmable apparatus, wherein printing travel documents at the printer located in the vicinity of the starting point of one of the parts of the journey includes verifying at least one of the digital signature of the boarding pass stored on the hand-held customer device or the digital signature of the bag tag stored on the hand-held customer device, wherein verifying the at least one of the digital signature of the boarding pass stored on the hand-held customer device or the digital signature of the bag tag stored on the hand-held customer device includes computing a second checksum, using a public key associated with the travel documentation distribution module to decrypt the first checksum, and verifying that the decrypted first checksum matches the computed second checksum, and in response to verifying the at least one of the digital signature of the boarding pass stored on the hand-held customer device or the digital signature of the bag tag stored on the hand-held customer device, printing the at least one of the boarding pass stored on the hand-held customer device or the bag tag stored on the hand-held customer device.

* * * * *